United States Patent

[11] 3,550,661

[72] Inventor Eugene Charles Moeller
2017 24th St. Road, Greeley, Colo. 80631
[21] Appl. No. 719,213
[22] Filed Apr. 5, 1968
[45] Patented Dec. 29, 1970

[54] METHOD OF AND APPARATUS FOR CLEANING A GRINDER SCREEN AND DISTRIBUTING MATERIALS
4 Claims, 4 Drawing Figs.

[52] U.S. Cl. ................................................ 146/242,
146/123; 241/166
[51] Int. Cl. ..................................................... B02c 18/08
[50] Field of Search............................................. 146/123,
122; 214/310 (Inquired); 209/379, 385
(Cursory), 387; 55/282, 300 (Cursory); 241/166,
186(Cursory); 198/59, 220

[56] References Cited
UNITED STATES PATENTS

| 2,650,745 | 9/1953 | Oberwortman | 146/123X |
| 2,873,921 | 2/1959 | Christiansen | 146/123X |
| 3,012,674 | 12/1961 | Hoppe | 209/379X |
| 3,235,103 | 2/1966 | Loveless | 198/59X |

*Primary Examiner*—Willie G. Abercrombie
*Attorney*—Bruce C. Lutz

ABSTRACT: Feed grinding means including an improved shaker pan for use therewith which distributes ground foilage and actively prevents plug-up of the grinder.

PATENTED DEC29 1970     3,550,661

INVENTOR.
EUGENE C. MOELLER
BY Bruce C Lutz
ATTORNEY 3,550,661

METHOD OF AND APPARATUS FOR CLEANING A GRINDER SCREEN AND DISTRIBUTING MATERIALS

THE INVENTION

This invention is generally related to distributing means and more particularly to an improved shaker pan which due to design and suspension does not allow the grinder to "plug up" with ground foilage or other material.

The present invention provides an improvement over the feed grinding apparatus found in my prior application No. 663,666 filed Aug. 28, 1967, now Pat. No. 3,483,906. As to the teachings of operation of the grinding mechanism, I wish to incorporate the material from the above referenced application into the present application.

While there have been many ways of distributing foilage and other materials from a feed grinder and other devices, these prior art devices have had a great disadvantage in often plugging up so that the grinder had to be shut down to clean out the mechanism. This has been especially true when distributing ground roughage or foilage.

The present invention utilizes a shaker pan which has longer pivotal arms attached to the front of the pan than the ones attached to the rear. The pan is also supported such that the upper pivotal arm connections are in a substantially straight line and the arms are forwardly angled toward the front of the shaker pan with respect to a vertical line. This type of support coupled with horizontal oscillatory movements applied to the rear of the shaker pan produce a pronounced movement of the bottom of the pan to more readily move the material forward in the pan than is the case in the prior art. Additionally the sides of the shaker pan are directed outwardly at an angle between 0° and 90° with respect to the bottom of the pan. This feature enables the sides of the shaker pan to prevent spilling of the foilage while still lifting the material and throwing it forward in a manner similar to that of the bottom of the pan. This construction thus eliminates the corner into which the foilage can be packed or wedged and thereby prevents buildup of material to obstruct proper operation of the grinding apparatus by plugging up the machine. The foilage, when thrown forward in this manner, brushed against the grinder screen as it is thrown to wipe or otherwise clean the screen of sticky or wet material.

The shaker pan may also have its bottom and/or sides corrogated or otherwise arranged to engage the foilage to provide an even better throwing and forward moving action.

It is therefore an object of this invention to provide improved material distributing apparatus.

Other objects and advantages of this invention may be ascertained from a reading of the specification and appended claims in conjunction with the drawings wherein:

Figure 1:
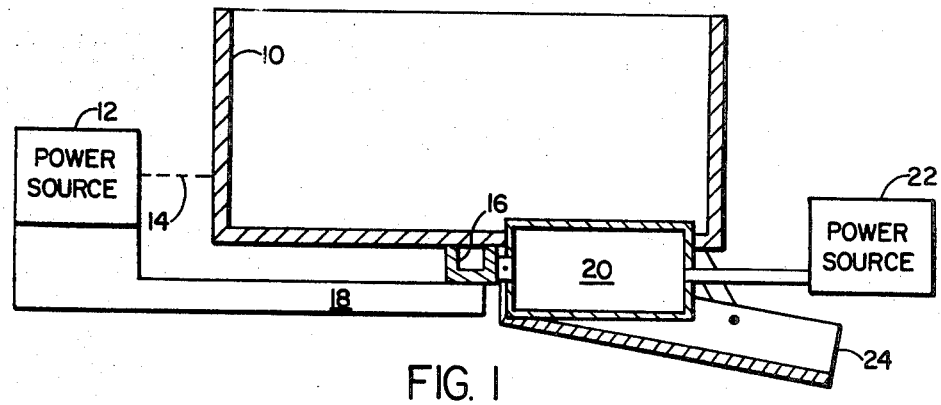
FIG. 1 is a cross-sectional view of a feed grinder with a simplified showing of the grinder and distributing portions.

In FIG. 1 a drum or open ended cylinder cylindrical container 10 is mechanically attached to a power source 12 of the oscillatory type be a dashed line 14. Drum 10 is supported at a pivot point 16 by a support generally designated as 18 which also serves as the support for the remainder of the apparatus shown. A grinding mechanism, generally designated as 19 includes a drum 20 (not shown in this FIG.), which is used to grind feed or roughage in the container 10, is powered by a shaft connected to a power source 22. Also included in the mechanism 19 and above the drum 20 is a screen 44 (not shown in this FIG.) and a further screen 49 (not shown in this FIG.) situated immediately below the drum 20. Below screen 49 there is shown a shaker pan 24. As will be noted, FIG. 1 is a very simplified presentation, showing the relationship of the grinding mechanism 19 and the pan 24 to the container 10. Therefore the portion of the support 18 which supports the pan 24 is not shown in this FIG. However it may be ascertained in later FIGS. that if shown it would be higher than the portion shown in FIG. 1.

Figure 2:
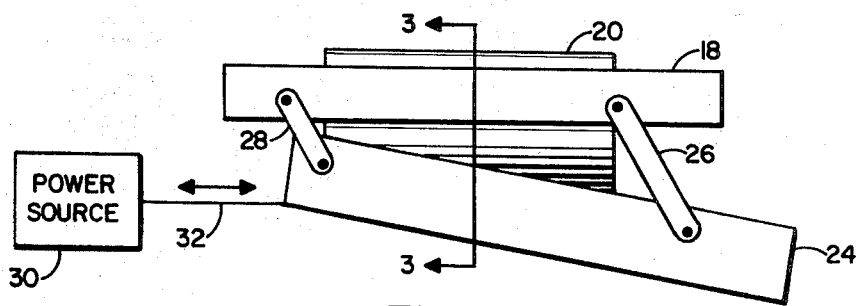
FIG. 2 is a side view of the pan in an operational position.

In FIG. 2 the pan 24 is hung from support 18 by front and rear legs or arms 26 and 28 respectively. If the end of the pan that is lower and from which the material is distributed is considered the front of forward section, it will be noted that the front arm 26 is longer than the rear arm 28. Each of the arms is pivotally connected to both the pan 24 and the support 18 with the pan pivot connections being forward of the support pivot connections. While it will be obvious that the pan can be biased to this position in many different ways, one simple way is by the use of a power source 30 which does not move with respect to support 18 and which is mechanically connected to pan 24 by a shaft 32. Power source 30 through the shaft 32 will apply back and forth or oscillatory movement in a horizontal direction to the pan 24 and may by the limit of its' travel prevent pan 24 from moving far enough to the rear to allow the arms to assume a vertical position. For completeness the grinding mechanism 19 is also shown enclosed on the lower portion thereof by the pan 24.

Figures 3, 4:
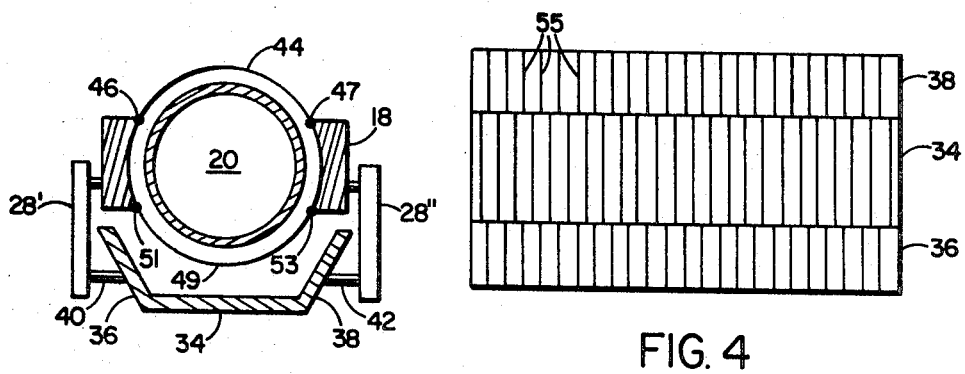
FIG. 3 is a cross-sectional view through 3-3 of FIG. 2.
FIG. 4 is a plan view of the shaker pan.

In FIG. 3 the pan 24 is shown as having a lower portion or base 34 and sides 36 and 38 which slope or angle outward from a vertical with the base 34. Arms 28' and 28'' support the rear of pan via shafts or pivotal connections 40 and 42. The upper portion of arms 28 are pivotally supported from support 18 as shown. A screen 44 is shown covering the drum 20 at its' upper extremity and is held in place by mounting means or hinges 46 and 47. This screen would be used only to grind small grains and would not be used in grinding roughage. A second screen 49 is attached to the lower portion of drum 20. Again, the lower portion of the drum 20 as enclosed by screen 49 is further enclosed by shaker pan 24.

In FIG. 4 the pan is shown having bottom 34 and sides 36 and 38 along with the additional feature of flights, steps, corrugations, or other material engaging means 55.

As may be more completely determined from my previously referenced application, the drum 10 is oscillated by source 12 such that it relatively slowly rises while moving forward and then quickly drops and moves back to its starting position before the material in the container can fall. Thus the material is advanced with respect to the container 10 upon each oscillatory movement thereof. The drum 20 within grinding mechanism 19 grinds the feed and drops it through screen 49 into the pan 24. The back and forth motion of the pan, which is accentuated with respect to the shaft 32 by the placement and relative lengths of the arms 26 and 28, moves the material in steps or short throwing motions down the length of the pan toward the front thereof. This action is somewhat similar to the forward movement of material in the drum 10. While the material is moving, it is being thrown forward so as to wipe the undersurface of the screen 49. As is well known to those skilled in the art, when wet or otherwise sticky material is being ground, it will tend to stick to any surface available. The movement of the pan tends to throw the material so that it won't stick to the pan. The wiping action of the material on the bottom of the screen will keep this area clean and free of material also. Since the sides of the pan produce the same throwing and wiping action as the bottom, the possibility of plugging up is greatly reduced over other types of material distributing means such as a conveyor which not only would not effectively distribute material from the sides but would fail to clean the sides of the screen and thus reduce the capacity of the grinding mechanism since there is less area for the ground material to come through.

While I have shown and described only one embodiment of the invention, I do not want to be limited thereby or to only grinding feed but only by the scope of the appended claims wherein the invention is broadly described. As previously indicated, the invention lies not only in the unique suspension for the shaker pan but also in the adaption of the pan to grinding apparatus to enable simultaneous distribution of the ground material while cleaning the grinding screen.

I claim:

1. Foilage grinding apparatus of the class utilizing an oscillating open ended cylinder with a grinding mechanism situated in a lower portion having a foilage distributing means therebelow the improvement comprising, in combination:

a shaker pan having front and rear pivotal arms with the front arms being longer than the rear arms and the arms being forwardly directed toward the shaker pan and the pan further having sides which extend outwardly with respect to a vertical from the bottom of the pan; and wherein said grinding apparatus additionally comprises a grinding screen enclosing a lower portion of said grinding mechanism and said pan additionally comprises foilage engaging means for throwing ground foilage forward and against the grinding screen to continuously clean said screen.

2. The method of preventing clogging between a grinding mechanism screen and a ground material distributing means situated therebelow comprising the step of oscillating said distributing means to continuously throw the ground material forwardly against the screen to clean the screen of ground materials sticking thereto while simultaneously distributing the same ground material.

3. Material grinding apparatus comprising in combination:

an oscillating cylindrical material holding means, including an opening in the bottom, for advancing material toward said opening;

grinding means situated with an upper portion thereof extending into said opening;

shaker pan means including high sides for enclosing a lower portion of said grinding means and engaging the material ground by said grinding means and advancing the ground material by oscillatory motion away from said grinding means;

front and rear pivotal legs for supporting said shaker pan wherein the front legs are longer than the rear legs; and screen means situated between said grinding means and said pan means and enclosing a lower portion of said grinding means wherein the advancement of the ground material brushed brushes against a lower surface of said screen means to keep it clean and thereby prevent clogging of the apparatus.

4. Apparatus as claimed in claim 3 wherein the pan includes material engaging means on a least one surface thereof.